US011074632B2

(12) United States Patent
Landers, Jr. et al.

(10) Patent No.: US 11,074,632 B2
(45) Date of Patent: Jul. 27, 2021

(54) METHOD AND SYSTEM FOR ASSOCIATING MULTIPLE PERSONS WITH A VIRTUAL TRANSACTION IN AN ENVIRONMENT

(71) Applicant: Toshiba Global Commerce Solutions Holdings Corporation, Tokyo (JP)

(72) Inventors: John David Landers, Jr., Raleigh, NC (US); Dean Frederick Herring, Youngsville, NC (US); Brad Matthew Johnson, Raleigh, NC (US); Ankit Singh, Morrisville, NC (US); Bobby Lewis Williams, Jr., Raleigh, NC (US); David John Steiner, Raleigh, NC (US); Phuc Ky Do, Morrisville, NC (US); Neil Andrew Girard, Durham, NC (US); Michael Schaefer, Carrboro, NC (US); Erin Kendall Dorshorst, Raleigh, NC (US); Craig Walton Turner, Raleigh, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 729 days.

(21) Appl. No.: 15/134,185

(22) Filed: Apr. 20, 2016

(65) Prior Publication Data

US 2017/0308942 A1    Oct. 26, 2017

(51) Int. Cl.
*G06Q 30/06* (2012.01)
(52) U.S. Cl.
CPC ..... *G06Q 30/0613* (2013.01); *G06Q 30/0635* (2013.01)
(58) Field of Classification Search
CPC . G06Q 30/0613; G06Q 30/0601–0645; G06Q 30/0635

USPC .......... 705/26.1–27.2, 26.41, 26.81
See application file for complete search history.

(56) References Cited

U.S. PATENT DOCUMENTS

| 7,006,982 | B2 | 2/2006 | Sorensen |
| 7,319,479 | B1 | 1/2008 | Crabtree et al. |
| 7,930,204 | B1 | 4/2011 | Sharma et al. |
| 8,009,863 | B1 | 8/2011 | Sharma et al. |
| 8,036,946 | B2 | 10/2011 | Angell et al. |
| 8,189,926 | B2 | 5/2012 | Sharma et al. |

(Continued)

OTHER PUBLICATIONS

Haritaoglu et al. ("Detection and Tracking of Shopping Groups in Stores,"   Proceedings of the 2001 IEEE Computer Society Conference on Computer Vision and Pattern Recognition, Dec. 2001) (Year: 2001).*

(Continued)

*Primary Examiner* — Allison G Wood
*Assistant Examiner* — Anna Mae Mitros
(74) *Attorney, Agent, or Firm* — Patterson + Sheridan, LLP

(57) ABSTRACT

A method, computer program product, and system are disclosed for compiling a virtual transaction for a person within an environment having a plurality of items. The method includes acquiring, using at least one visual sensor, first image information including a person. The method further includes identifying the at least one person from the first image information by classifying the person into a class. The method also includes acquiring second image information including the person and an item. The method further includes identifying a behavior of the person relative to the item, and updating, based on the identified behavior, the virtual transaction.

17 Claims, 13 Drawing Sheets

FIG. 2

(56) References Cited

U.S. PATENT DOCUMENTS

| | | | |
|---|---|---|---|
| 8,219,438 | B1 | 7/2012 | Moon et al. |
| 8,325,982 | B1 | 12/2012 | Moon et al. |
| 8,380,558 | B1 | 2/2013 | Sharma et al. |
| 8,502,869 | B1 | 8/2013 | Fuhr et al. |
| 9,794,359 | B1* | 10/2017 | Lessin ............... G06Q 50/01 |
| 2006/0149628 | A1 | 7/2006 | Chefalas et al. |
| 2012/0182172 | A1 | 7/2012 | Sorensen |
| 2012/0185355 | A1* | 7/2012 | Kilroy ............ G06Q 30/0633 |
| | | | 705/26.8 |
| 2012/0320199 | A1 | 12/2012 | Kundu et al. |
| 2013/0044914 | A1 | 2/2013 | Rai et al. |
| 2013/0092728 | A1* | 4/2013 | Vik .................. G06Q 50/22 |
| | | | 235/375 |
| 2013/0103539 | A1* | 4/2013 | Abraham ........ G06Q 30/0633 |
| | | | 705/26.8 |
| 2013/0211953 | A1* | 8/2013 | Abraham ........... G06Q 30/06 |
| | | | 705/26.8 |
| 2013/0284806 | A1 | 10/2013 | Margalit |
| 2013/0304595 | A1 | 11/2013 | Goncalves |
| 2013/0332271 | A1 | 12/2013 | Hay |
| 2014/0132728 | A1 | 5/2014 | Verano et al. |
| 2014/0213366 | A1* | 7/2014 | Argue ................ A63F 13/65 |
| | | | 463/40 |
| 2014/0316916 | A1 | 10/2014 | Hay |
| 2015/0029339 | A1 | 1/2015 | Kobres et al. |
| 2015/0039458 | A1* | 2/2015 | Reid ............... G06K 9/00335 |
| | | | 705/26.1 |
| 2016/0078264 | A1* | 3/2016 | Armstrong ...... G08B 13/2417 |
| | | | 340/572.1 |
| 2017/0091850 | A1* | 3/2017 | Alvarez ........... G06Q 30/0633 |

OTHER PUBLICATIONS

Popa et al., "Analysis of shopping behavior based on surveillance system," Proceedings of the IEEE International Conference on Systems, Man and Cybernetics, Istanbul, Turkey, Oct. 10-13, 2010, pp. 2512-2519.

Notification of Transmittal of the International Search Report and the Written Opinion of the International Searching Authority, or the Declaration for International Application No. PCT/US2017/028667, dated Jul. 13, 2017.

* cited by examiner

402 — STORE INVENTORY

| IDENTIFICATION | STATUS | DAYS UNTIL EXPIRED | # IN STOCK | # AVAILABLE | # ORDERED |
|---|---|---|---|---|---|
| ITEM A | FRESH | 25 | 10 + 2 | 10 + 1 | 0 |
| ITEM B | FRESH | 5 | 5 | 5 - 1 | 5 |
| ITEM C | EXPIRED | 0 | 20 | 0 | 20 |
| ITEM D | FRESH | 20 | 0 + 5 | 0 | 10 - 5 |
| ⋮ | ⋮ | ⋮ | ⋮ | ⋮ | ⋮ |
| ITEM n | V | W | X | Y | Z |

404 IDENTIFICATION, 406 STATUS, 407 DAYS UNTIL EXPIRED, 408 # IN STOCK, 410 # AVAILABLE, 412 # ORDERED

414 — CUSTOMER INFORMATION

LOYALTY # : 0123456  418

KNOWN PERSONS 416
- NAME 1
- NAME 2
- NAME 3

ASSOCIATED PERSONS 420
- NAME 1
- CUSTOMER 3

PAYMENT TYPES 422
- CC# : 0011223344
- CASH BALANCE $ 12.34

VIRTUAL TRANSACTION 424

| ITEM I.D. | QUANTITY | LOCATION | PROMOTION | PURCHASED |
|---|---|---|---|---|
| ITEM 2 | 1 | CART | 50 % | N |

436 — EMPLOYEE INFORMATION

| EMPLOYEE I.D. : ABC123 _438_ | | | ON SHIFT : Y _442_ |
|---|---|---|---|
| HOURS WORKED : 24.0 _440_ | | | ON BREAK : N _444_ |

VIRTUAL TRANSACTION _446_

| ITEM I.D. _448_ | QUANTITY _450_ | # DAMAGED _452_ | LOCATION _454_ |
|---|---|---|---|
| ITEM 1 | 2 | 1 | SHELF |

456 — VENDOR INFORMATION

| VENDOR I.D. : XYZ _458_ | DELIVERY WINDOW : 1:00 PM - 3:00 PM WEDNESDAY _460_ |
|---|---|

VIRTUAL TRANSACTION _462_

| ITEM I.D. _464_ | QUANTITY _466_ | # ORDERED _468_ | LOCATION _470_ |
|---|---|---|---|
| ITEM 4 | 5 | 10 | TROLLEY |

FIG. 4B

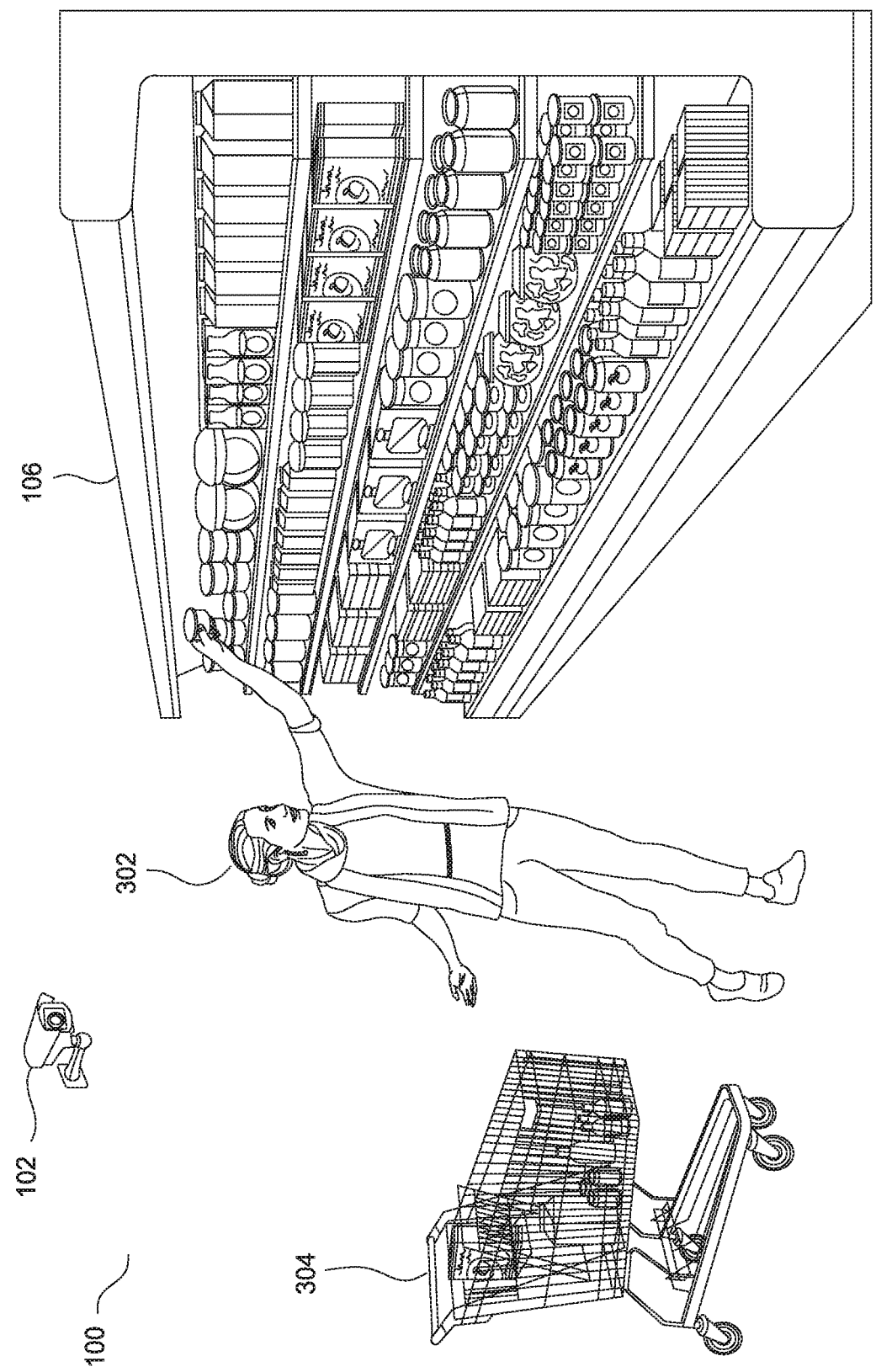

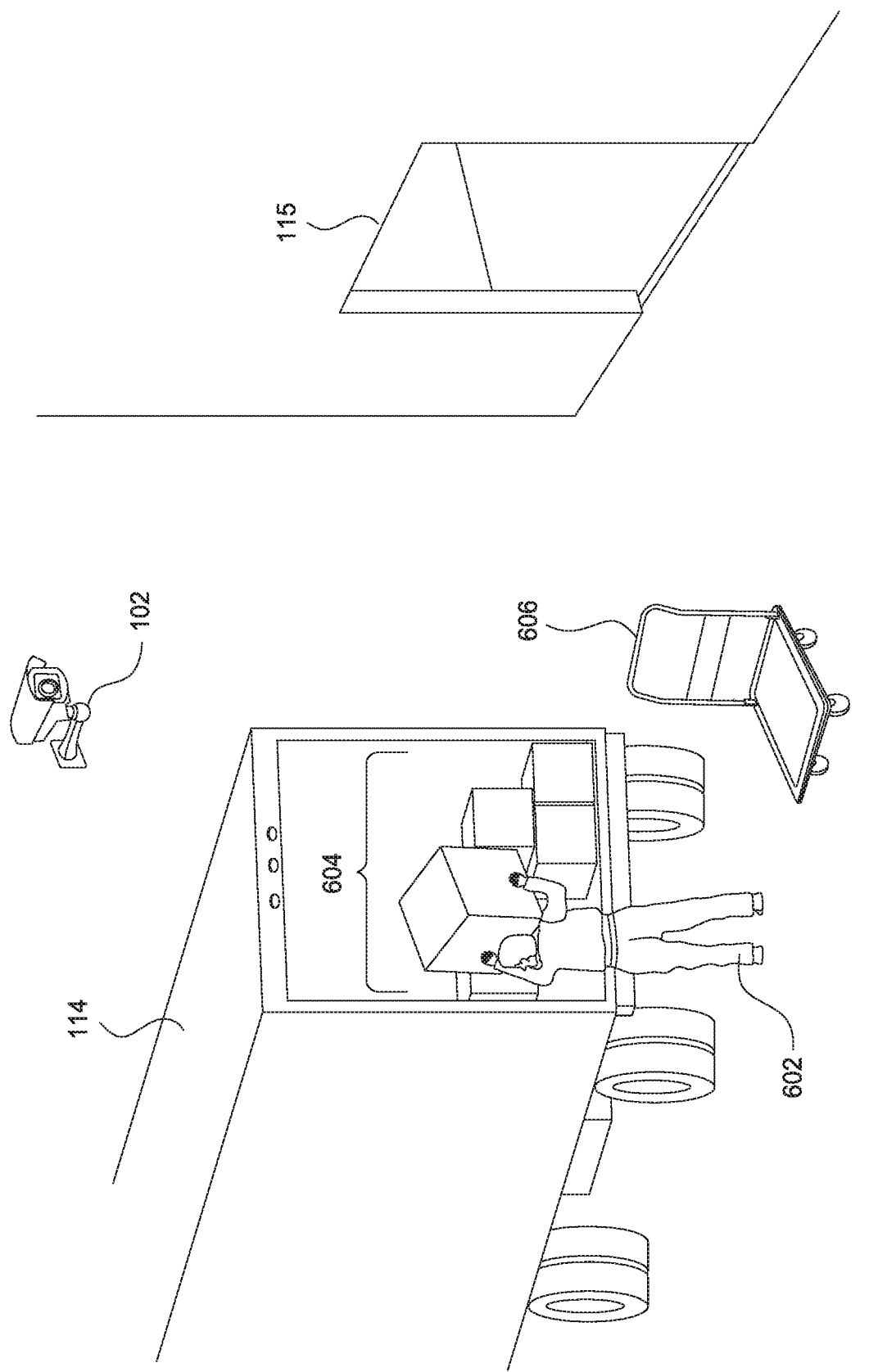

750 ~ CUSTOMER ASSOCIATION

| FIRST CUSTOMER I.D. /710 | SECOND CUSTOMER I.D. /712 | KNOWN CUSTOMER /714 | DISTANCE /716 | ENTRANCE TIME /718 | PHYSICAL INTERACTION /720 | VERBAL COMMUNICATION /722 | TOTAL SCORE /724 |
|---|---|---|---|---|---|---|---|
| 702 | 704 | 75 | 95 | 95 | 100 | 25 | 390 |
| 702 | 706 | 18 | 75 | 75 | 0 | 15 | 183 |
| 704 | 706 | 16 | 85 | 85 | 0 | 20 | 206 |

FIG. 7B

METHOD AND SYSTEM FOR ASSOCIATING MULTIPLE PERSONS WITH A VIRTUAL TRANSACTION IN AN ENVIRONMENT

BACKGROUND

The present disclosure relates to an environment having a plurality of visual sensors disposed within the environment, and more specifically, to compiling a virtual transaction of purchasable items within the environment using the visual sensors.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIGS. 4A and 4B illustrate exemplary data structures related to maintaining virtual transactions within an environment, according to one embodiment.

FIGS. 5A-5C, 6A, and 6B illustrate exemplary identification of a behavior of a person with an item within an environment, according to one embodiment.

FIGS. 7A and 7B illustrate an exemplary association of multiple persons with a virtual transaction within an environment, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Aspects of the current disclosure relate to an environment capable of compiling a virtual transaction for a person within the environment. A number of different visual sensor devices may be employed within the environment and networked to a controller to monitor a person's interaction with purchasable items within the environment to compile a virtual transaction.

Using a system having one or more visual sensors within the environment, a retailer or other provider may compile and process image data to identify various items that have been associated with a person to allow for a seamless checkout transaction. The association of the item with the person may be based on determined actions of the person, such as handling the item, placing the item in a shopping receptacle, walking away from the item's original location with the item, etc. The system uses the association to build a virtual transaction for the person as well as managing the inventory of items within the environment.

By compiling a virtual transaction in real time, a retailer may reduce or completely eliminate the need for checkout lanes, as a person may simply interact with items and leave the environment to complete the transaction. The retailer may also compile valuable data on the inventory of items within the environment, employee performance, vendor performance, and customer interaction with items. While generally discussed within the context of a shopping environment, such as a retail store or other commercial environment, it is contemplated that the techniques disclosed herein may be applied to other environments (some non-limiting examples include libraries, museums, classrooms, hospitals, etc.) to provide a similar experience for persons included therein.

Figure 1:
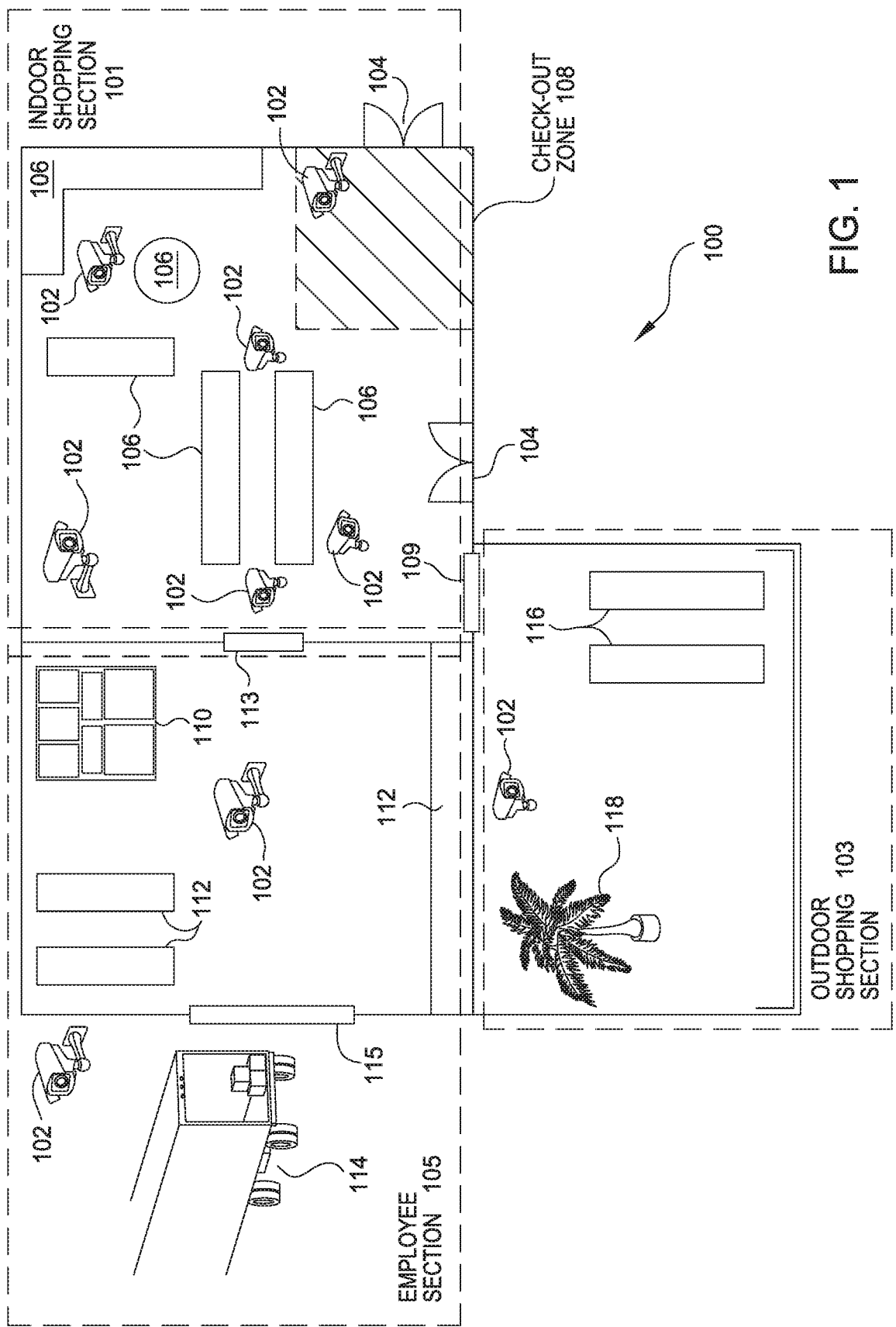
FIG. 1 illustrates an exemplary environment including a plurality of purchasable items, according to one embodiment.

FIG. 1 illustrates an exemplary environment including a plurality of purchasable items, according to one embodiment. Environment 100 is depicted as a top-down plan view of an exemplary commercial environment. The environment 100 may be physically and/or logically separated into different sections so as to allow section-specific analysis to be performed. In an exemplary embodiment, the environment 100 includes an indoor shopping section 101, an outdoor shopping section 103, and an employee section 105. Other embodiments of environment 100 may have different numbers and/or types of sections. The environment 100 includes a plurality of visual sensors 102 disposed throughout the environment 100. Each of the visual sensors 102 includes one or more types of visual sensors such as visible light sensors, infrared (IR) sensors, and so forth. Although not shown, the visual sensors 102 may further include other types of sensors such as audio sensors (e.g., microphones), pressure sensors, and so forth. Generally, the visual sensors 102 may be disposed at any suitable location within the environment 100. Some non-limiting examples of locations include below, within, or above a floor of the environment 100, within other structural components of the environment 100 such as walls or ceiling structures. In some embodiments, sensors may be disposed on, within, or near item display areas such as a display unit 106. As will be explained in greater detail below, the visual sensors 102 are used to monitor purchasable items disposed throughout the environment 100, to identify and monitor a plurality of persons within the environment 100 and interactions between the plurality of persons and the purchasable items.

Now referring to the indoor shopping section 101, in an exemplary embodiment, at least some of the visual sensors 102 are oriented towards doorways 104 or alternate areas of ingress and/or egress in order to identify customers that entering and/or exiting the environment 100, as will be explained in further detail in FIG. 3. Further, at least some of the visual sensors 102 may be oriented towards display units 106 so as to capture interactions between customers and purchasable items located on the display units 106 as will be explained in greater detail with FIG. 5. In one exemplary embodiment, at least one visual sensor 102 is oriented to monitor a designated checkout zone 108 within the indoor shopping section 101. After a customer has added one or more purchasable items to their associated virtual transaction, the customer may enter the checkout zone 108 to complete the virtual transaction before exiting the environment 100. Thus, the customer is able to pay for the virtual transaction without having to go through the typical process of manually scanning each individual item at a checkout station. Instead, in some embodiments the customer can collect purchasable items and merely walk through the checkout zone 108 and out the doorways 104.

In an exemplary embodiment, the environment 100 includes an outdoor shopping section 103 having one or more visual sensors 102 disposed therein. As shown, the outdoor shopping section 103 is connected to the indoor shopping section 101 via doorway 109. The outdoor shopping section 103 may also be connected to the employee section 105 or may be detached from both sections. The outdoor shopping section 103 may contain outdoor display units 116 and any suitable outdoor purchasable items 118 such as nursery items (e.g., flowers and trees), building materials, and so forth.

In an exemplary embodiment, the environment 100 includes an employee section 105 having one or more visual sensors 102. The employee section 105 is shown as connected with indoor shopping section 101 via doorway 113, but alternately may be connected or detached from the indoor shopping section 101 and/or the outdoor shopping section 103. The employee section 105 may contain pallets 110 of purchasable items to be distributed within the environment 100 as well as storage units 112 for storing purchasable items until needed. Employees may traverse the doorway 113 to distribute purchasable items onto the display units 106 of the indoor shopping section 101. Additionally, employees may use doorway 115 to access shipments 114 of purchasable items (e.g., accessing a trailer). The visual sensors 102 included in the employee section 105 may be oriented so as to alert employees when a shipment 114 of purchasable items arrives.

Figure 2:
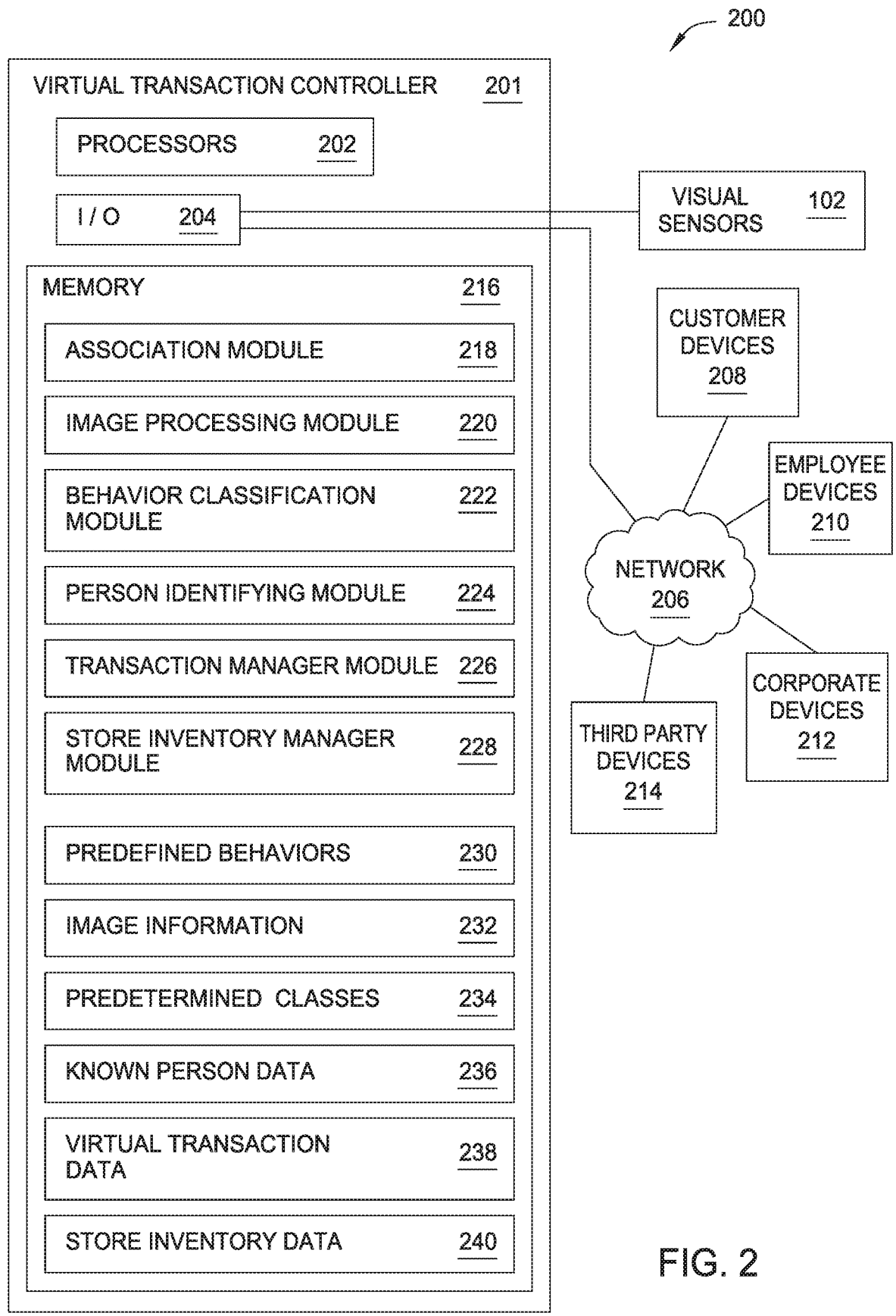
FIG. 2 is a block diagram illustrating operation of an exemplary system to facilitate compiling a transaction within an environment, according to one embodiment.

Turning to FIG. 2, an exemplary system 200 is shown for compiling a virtual transaction within a store, according to one embodiment. The system 200 comprises a virtual transaction controller 201 (or "controller"). The controller 201 has one or more processors 202, input/output ports (I/O) 204, and a memory 216. In one embodiment, the controller 201 is implemented as a singular computing device having any suitable form. In other embodiments, controller 201 is distributed and includes a plurality of discrete computing devices that are connected through wired or wireless networking. The processors 202 may include any processing element suitable for performing functions described herein, and may include single or multiple core processors, as well as combinations thereof. Processors 202 may be included in a single computing device, or may represent an aggregation of processing elements included across a number of networked computing devices, which may include device such as the customer devices 208, employee devices 210, and so forth.

The controller 201 may communicate with the visual sensors 102 via the I/O 204. For example, the controller 201 may receive image data from the visual sensors 102 for processing. The controller 201 may be connected to a network 206 to communicate with a plurality of computing devices, some of which may be disposed outside the environment 100. Network 206 may include one or more networks of various types, including a local area or local access network (LAN), a general wide area network (WAN), and/or a public network (e.g., the Internet). In one example, the controller 201 may communicate via network 206 with customer devices 208 to relay information helpful for customers within the environment 100 such as discounted items, coupons, item location information, and so forth. The customer devices 208 are mobile computing devices having any suitable form, such as handheld computing devices (e.g., tablets, smartphones) or worn computing devices (e.g., an optical head-mounted display). The controller 201 may also communicate with employee devices 210, which may also include mobile computing devices and/or stationary computing devices (e.g., terminals, desktop computers). In some embodiments, the controller 201 communicates notifications to employee devices 210 indicating various conditions occurring within the environment such as an item running out of stock, a spill in an aisle, an arrival of a shipment 114 of purchasable items, and so forth. The controller 201 may also facilitate communication between multiple devices such as the customer devices 208 and/or the employee devices 210. For example, the controller 201 may receive a message from a customer device 208 indicating that a customer needs help reaching an item. The controller 201 communicates to an employee device 210 the location of customer device 208, as well as the problem to be solved. The controller 201 may also communicate with one or more corporate devices 212 to facilitate the ordering of items, send customer data for analyzing, and so forth. The corporate devices 212 are computing devices having any suitable form, such as handheld computing devices (e.g., tablets, smartphones), worn computing devices (e.g., an optical head-mounted display), or stationary computing devices (e.g., terminals, desktop computers). The controller 201 may communicate with third party devices 214, such as computing devices associated with vendors, to order items, communicate status of shipments, etc. The third party devices 214 are computing devices having any suitable form, such as handheld computing devices (e.g., tablets, smartphones), worn computing devices (e.g., an optical head-mounted display), or stationary computing devices (e.g., terminals, desktop computers).

Memory 216 may include a variety of computer-readable media selected for their size, relative performance, or other capabilities: volatile and/or non-volatile media, removable and/or non-removable media, etc. Memory 216 may include cache, random access memory (RAM), storage, etc. Storage included as part of memory 216 may provide a non-volatile memory for the networked computing devices (e.g., employee devices 210, corporate devices 212), and may include one or more different storage elements such as Flash memory, a hard disk drive, a solid state drive, an optical storage device, and/or a magnetic storage device. Memory 216 may be included in a single computing device or may represent an aggregation of memory included in networked devices.

For simplicity, the following paragraphs reference specific functional modules and data in explaining the functionality of controller 201, but are not intended to limit the embodiments of the present disclosure. The memory 216 may comprise any number of modules and/or data. It is to be understood that the modules and data may be capable of communicating to all other modules and data within memory 216, and that the controller 201 encompasses the functionality of all modules and data described in the following paragraphs.

The memory 216 may store a plurality of modules configured to be executed by the processors 202, as well as data. The modules generally comprise program code, which when operated by the processors 202, perform a variety of functions for administering the environment 100. An image processing module 220 receives image information 232 from visual sensors 102, and performs image processing on the image information according to known techniques. The image information 232 may be in any form suitable for identifying person, items, and behaviors within the environment, such as full-motion video, still frames, etc. An association module 218 analyzes image information 232 from visual sensors 102 and/or data from image processing module 220 to determine whether to associate or disassociate multiple shoppers with a single virtual transaction.

Person identifying module 224 analyzes image information 232 from visual sensors 102 and/or data from image processing module 220 to determine which of the predetermined classes 234 a person within the environment 100 is a member. Some non-limiting examples of predetermined classes 234 include a customer, an employee, a vendor, etc. Person identifying module 224 identifies persons within the environment 100 by analyzing image information 232 from visual sensors 102 and/or data from image processing module 220 to identify physical traits of persons such as gender, height, hair color, eye color, clothing, and so forth. Person identifying module 224 compares the aforementioned traits with known person data 236 to determine if the identified person is a known person. In one example, person identifying module 224 may recognize a person as an employee within predetermined classes 234 having physical traits that match employee "John Doe" in known person data 236. Thus, person identifying module 224 identifies the person as employee "John Doe," and controller 201 can now identify "John Doe" throughout the environment 100. In another example, person identifying module 224 may recognize the person as a customer within a particular predetermined class 234, but does not have traits matching the person in known person data 236. The person identifying module 224 may identify the customer using a place holder such as "Customer 1," and controller 201 can now identify "Customer 1" throughout the environment 100.

Transaction manager module 226 keeps track of the various transactions for each of the persons within the environment 100. Transaction manager module 226 uses data from person identifying module 224 to create virtual transaction data 238 for each of the identified persons within environment 100. Virtual transaction data 238 contains dynamically updated information related to transactions between the person and the environment 100, such as items associated with the person, the number of items, and so forth, as will be explained in greater detail in FIGS. 4A-4B. A behavior classification module 222 analyzes image information 232 from visual sensors 102 and/or data from image processing module 220 to identify predefined behaviors 230 of identified persons within environment 100 to determine whether or not an item should be added to the person's associated virtual transaction data 238. Predefined behaviors 230 comprise behaviors associated with interacting with items, which may include direct interactions with item(s) and/or behaviors which generally increase or decrease a likelihood that the person will interact with item(s). Some non-limiting examples of predefined behaviors 230 include moving towards a display unit, adding an item to a display unit, removing an item from a display unit, holding an item, gesturing towards an item, and so forth. Transaction manager module 226 may use data from behavior classification module 222 to add/remove items from a person's virtual transaction data 238.

Store inventory manager module 228 keeps track of the store inventory data 240 within the environment 100. Store inventory data 240 comprises information on the various items within environment 100. Some non-limiting examples include number in stock, number available, number ordered, and so forth. Store inventory manager module 228 may use data from behavior classification module 222 to update the store inventory data 240 based on the behavior associated with the identified person. Alternatively, transaction manager module 226 may notify store inventory manager module 228 that an item has been added/removed from a person's virtual transaction data 238, and the store inventory module 228 updates the store inventory data 240 as necessary.

Figure 3:
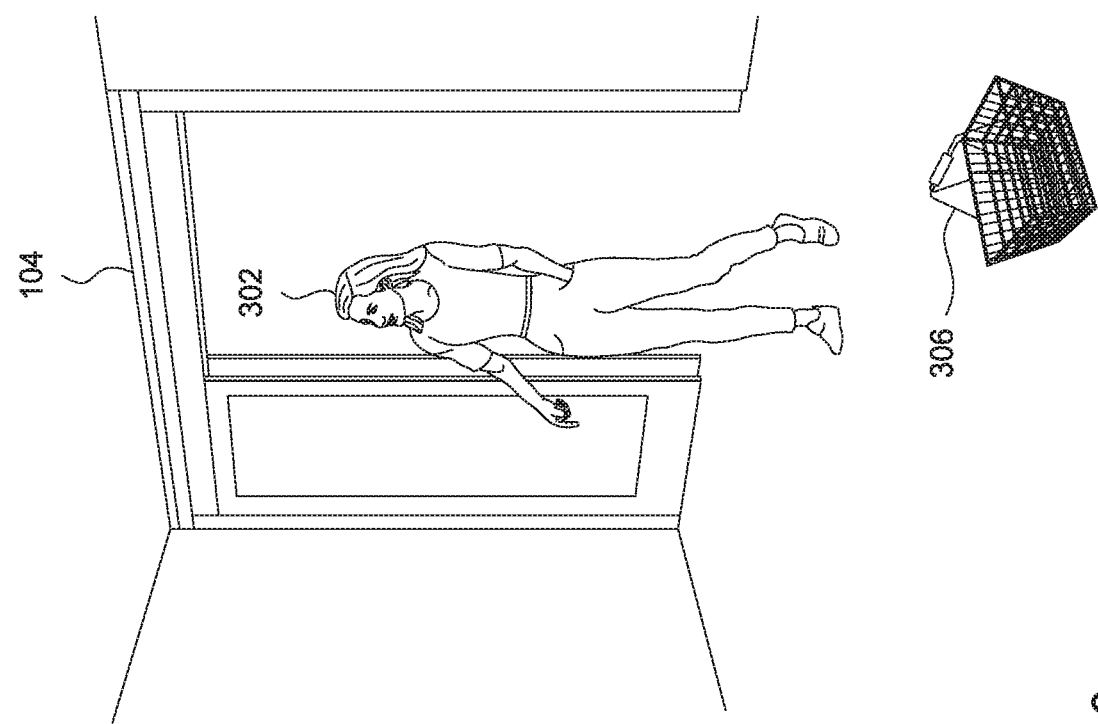
FIG. 3 illustrates an exemplary identification of a person within an environment, according to one embodiment.
Figure 3:
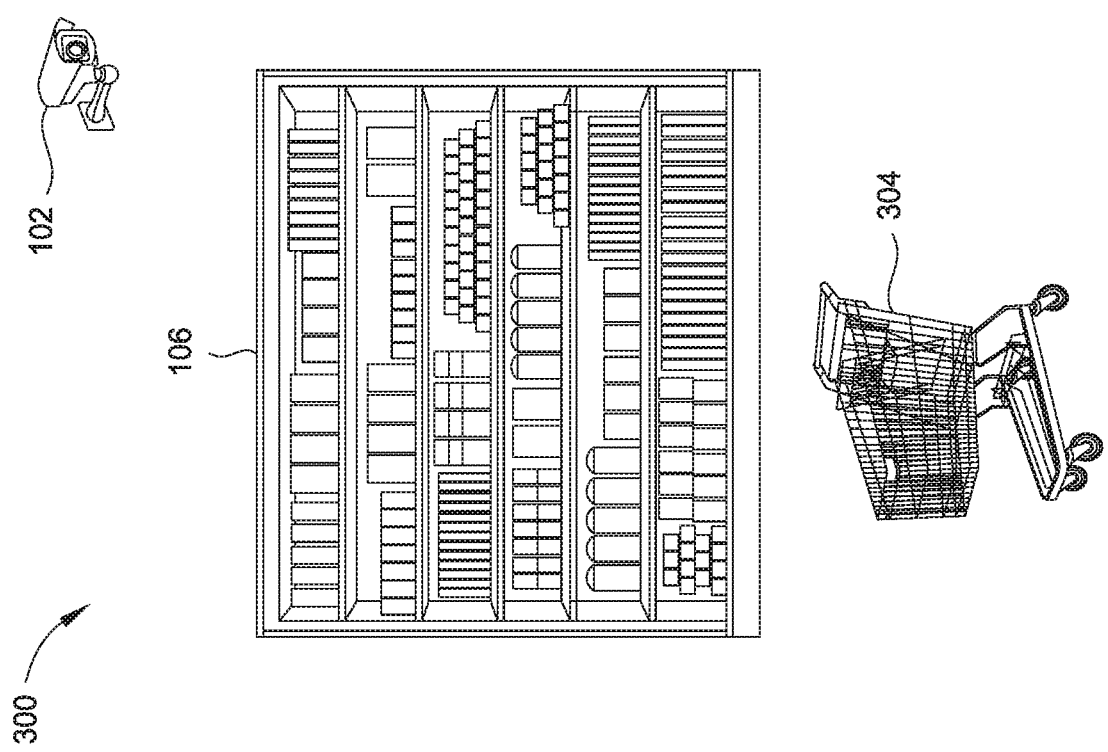

Turning to FIG. 3, an exemplary identification of a person within a store is illustrated, according to one embodiment. Generally, view 300 illustrates operation of the person identifying module 224 of the controller 201 of FIG. 2 within environment 100. In view 300, a single customer 302 is shown for simplicity, but the techniques discussed herein may apply to multiple persons within the environment 100. In an exemplary embodiment, as customer 302 enters through doorway 104 into the environment 100, at least one of the visual sensors 102 is oriented to acquire image information including the customer 302. The acquired image information may be used by any of the aforementioned modules, such as image processing module 220 and/or person identification module 224, to identify the customer 302. Additionally, the controller 201 (FIG. 2) may be further configured to visually identify transactional items within environment 100, such as a shopping cart 304 and/or shopping basket 306. Based on visually observed interactions of the customer 302 with the shopping cart 304 and/or the shopping basket 306, the controller 201 may associate the shopping cart 304 and shopping basket 306 (and any purchasable items stored therein) with customer 302 for the associated virtual transaction.

The person identifying module 224 may take into account various visually observable attributes of the customer 302 when determining the identification. Some non-limiting examples include gender, age, height, weight, hair color, eye color, skin tone, and tattoos. The person identifying module 224 may perform identification based one or more additional attributes, such as a time of day, clothing worn by the customer 302, jewelry, and so forth. For example, the person identifying module 224 determines that the customer 302 is female, approximately 5 feet tall, has long brown hair and blue eyes, is approximately 32 years old, and entered the environment 100 at 6:00 P.M. In another example, the person identifying module 224 may perform identification based on the presence of a customer device 208 (FIG. 2) such as a smartphone. The customer device 208 may notify the controller 201 via network 206 that customer 302 has entered the environment 100. Alternatively, the controller 201 may recognize the customer device 208 as a device previously registered in known persons data 236, and person identifying module 224 may identify customer 302 based on this association. In some embodiments, the determined attributes can be collected anonymously (i.e., without association with any personally identifying information) to protect and respect customer privacy, but this is not a requirement. For example, the person identifying module 224 may use some or all of the determined attributes to identify customer 302 as "Customer A." After identifying "Customer A," in some cases the person identifying module 224 deletes some or all of the determined attributes, as the controller 201 may subsequently track the customer 302 as "Customer A." In this way, the controller 201 need not store all determined information related to customer 302 once identified. Rather, a placeholder can be used to track customer 302 and the virtual transaction can be associated with the place holder.

Alternatively, customer 302 has previously provided information to the environment 100 and/or acquiesced to have the controller 201 store information on customer 302. For example, after recognizing the various attributes of the customer 302, the person identifying module 224 may recognize the identified customer 302 as a known person (i.e., customer 302 is a loyalty member of the or has been within the environment 100 previously). Thus, the person identifying module 224 may use the visually determined attributes and associate the customer 302 with a specific loyalty member (e.g., "Jane Doe" having loyalty number "0123456"). While FIG. 3 has been described as assuming the identified person is a customer for simplicity, it should be understood that person identifying module 224 determines which predetermined class 234 to which the identified person within the environment 100 belongs. That is, person identifying module 224 identifies customers as well as other classes of persons within the environment 100 such as employees, vendors, etc.

FIGS. 4A-4B illustrate exemplary data structures related to maintaining virtual transactions within an environment, according to one embodiment. An exemplary store inventory data 240 (FIG. 2) of environment 100 is shown in FIG. 4A as store inventory 402. The store inventory manager module 228 may keep track of the number of purchasable items being sold to customers or stocked by employees via store inventory 402 to keep an up to date list of the items within the environment 100 in real time. The store inventory 402 contains a plurality of items A, B, C, D, n. Any amount of items may be tracked by the store inventory 402 and items A-D are used for simplicity. The store inventory 402 may comprise columns relating to particular properties of each item such as identification 404, status 406, number in stock 408, number available 410, and the number ordered 412. The identification 404 may identify a purchasable item by a visual identifier such as a Universal Product Code (UPC) or quick response (QR) code, a location of the purchasable item within the environment 100, and/or other distinguishing parameters. The store inventory manager module 228 may track the status 406 of purchasable items, such as if the item is past its expiration date or is still fresh. Further, the store inventory manager module 228 may monitor the days until expired 407 of the individual items. For example, the store inventory manager module 228 may recognize Item B only has five days until expired 407 and may preemptively order more of Item B so as to replace Item B when the status 406 changes from "Fresh" to "Expired." This may allow the environment 100 to increase customer satisfaction by reducing the time items are out of stock.

The store inventory manager module 228 may also track the number in stock 408 compared to the number of items available 410 within the environment 100. For example, when a customer 302 (FIG. 3) adds one (1) of Item B to their virtual transaction, the number available 410 for Item B is reduced by one (1), but the number in stock 408 for Item B still has five (5) items in stock 408 as the customer 302 has not yet completed the transaction. In this way, the store inventory manager module 228 is able to track items as soon as the item is associated with a customer until the customer completes the transaction. The store inventory manager module 228 may further track a number ordered 412 of particular items. For example, the system may recognize item C has a status 406 of "Expired" so it is no longer available for sale, which is reflected in item C having zero (0) as the number available 410. The store inventory manager module 228 may order more, twenty (20) in this example, to replenish the stock which is reflected by the number ordered 412. Thus, the store inventory manager module 228 is capable of keeping track of the various purchasable items within the environment 100 using store inventory 402 in real time.

An exemplary data structure for individual customer information 414 is illustrated. The customer information 414 contains data on associated persons 420 with the customer and the virtual transaction 424. As will be described in more detail with regards to FIG. 7, associated persons 420 may be persons whom the association module 218 recognizes should be associated with a single virtual transaction, such as members of a family being on a single transaction. The virtual transaction 424 may contain information on items such as item identification 426, quantity 428 of the item, location 430 of the item such as in a cart 304, a promotion 432 such as a discount, and whether the item has been purchased 434. The transaction manager module 226 may add an item to the virtual transaction 424 (or remove an item from the virtual transaction 424) based on the customer's visually observed interactions with purchasable items, which will be described in greater detail with regards to FIG. 5.

Customer information 414 may contain additional information associated with a customer such as known persons 416, loyalty number 418, and payment types 422. Known persons 416 contains information on persons having visually observed association(s) with an individual customer or were previously added to customer information 414 by an individual customer. As shown, customer information 414 contains information on three known persons 416: Name 1; Name 2; and Name 3. Known persons 416 may be people the customer regularly enters the environment 100 with such as family members, friends, co-workers, and so forth. The association module 218 may store information on the various known persons 416 so as to better associate the known persons 416 with the customer 414 on a single virtual transaction 424. The association module 218 distinguishes between known persons 416 and associated persons 420 to encompass situations where a person associated with the customer is not a known person.

Customer information 414 contains information on different payment types 422. As shown, payment types include a credit card (CC #) as well as a cash balance stored with the environment 100, but may include any suitable alternate payment method, such as a virtual currency. For example, a customer may have associated credit card information with their loyalty number 418 and deposited cash with the environment 100. Payment information included in payment types 422 may allow the customer to seamlessly checkout. For example, as the customer interacts with purchasable items and/or transactional items within the environment 100, the transaction manager module 226 may add items to the customer's virtual transaction 424. The customer may then proceed to checkout zone 108 as shown in FIG. 1. Once the customer has entered the checkout zone 108, the transaction manager module 226 may recognize the customer stored a payment type 422 and automatically charge or debit the selected payment type 422 for the items included in the virtual transaction 424. In this manner, a purchase transaction is completed between the environment 100 and the customer without the need to go through conventional checkout processes.

The controller 201 may also use a data structure for keeping employee information 436. As shown in FIG. 4B, employee information 436 contains an employee identification (I.D.) 438, hours worked 440, whether the employee is on shift 442, whether the employee is on break 444, and a virtual transaction 446. The controller 201 may monitor the hours worked 440 to ensure the employee is working the appropriate amount of time (e.g., working the minimum required, not going into overtime, etc.). The controller 201 may also monitor whether the employee is on shift 442 and on break 444. This can allow the controller 201 to ensure employees are properly clocking in/out as well as getting breaks. For example, the controller 201 may recognize an employee is entering the environment 100 and may then check whether the employee is supposed to be on shift 442 and clock the employee in. In another example, controller 201 may recognize an employee has not taken their lunch break as required and send a reminder to an employee device 210 (FIG. 2) associated with the employee to inform them to take a break.

Employee information 436 contains a virtual transaction 446. In some embodiments, the virtual transaction 446 maintained by transaction manager module 226 for an employee differs in content from the virtual transaction 424 maintained for a customer. Virtual transaction 446 contains information such as an item I.D. 448, quantity of the item 450, whether an item is damaged 452, and location of the item 454. As will be explained in more detail with regards to FIG. 6, the transaction manager module 226 may update the virtual transaction 446 of an employee based on interactions with items in environment 100. For example, an employee may be stocking Item A within the environment 100 and one (1) of Item A is damaged 452. The transaction manager module 226 may recognize an item is damaged or the employee may inform the system that an item is damaged. After being informed of the damaged item, the transaction manager module 226 will appropriately update the virtual transaction 446 as well as notify store inventory manager module 228 to update store inventory 402.

The controller 201 may have a data structure containing vendor information 456. As shown in FIG. 4B, vendor information 456 contains a vendor I.D. 458, delivery window 460, and a virtual transaction 462. The vendor I.D. 458 may be used to easily identify a vendor when the vendor enters the environment 100. The controller 201 may use delivery window 460 to recognize when more of a specific item will be stocked. The virtual transaction 462 contains item I.D. 464, quantity 466, number ordered 468, and location 470. In some embodiments, the virtual transaction 462 for a vendor differs in content from the virtual transaction 424 (customer) and/or virtual transaction 446 (employee). The store inventory manager module 228 may use virtual transaction 462 to update the store inventory 402. For example, a vendor may be delivering Item D. The vendor may have only brought five, the quantity 466, of Item D even though the store manager module 228 had ordered ten as shown by number ordered 468. The store manager module 228 may also recognize the location of Item D 470 as being on a trolley associated with the vendor. Thus, the store manager module 228 is able to update the store inventory 402 in real time based on the vendor information 456.

Figure 5A:
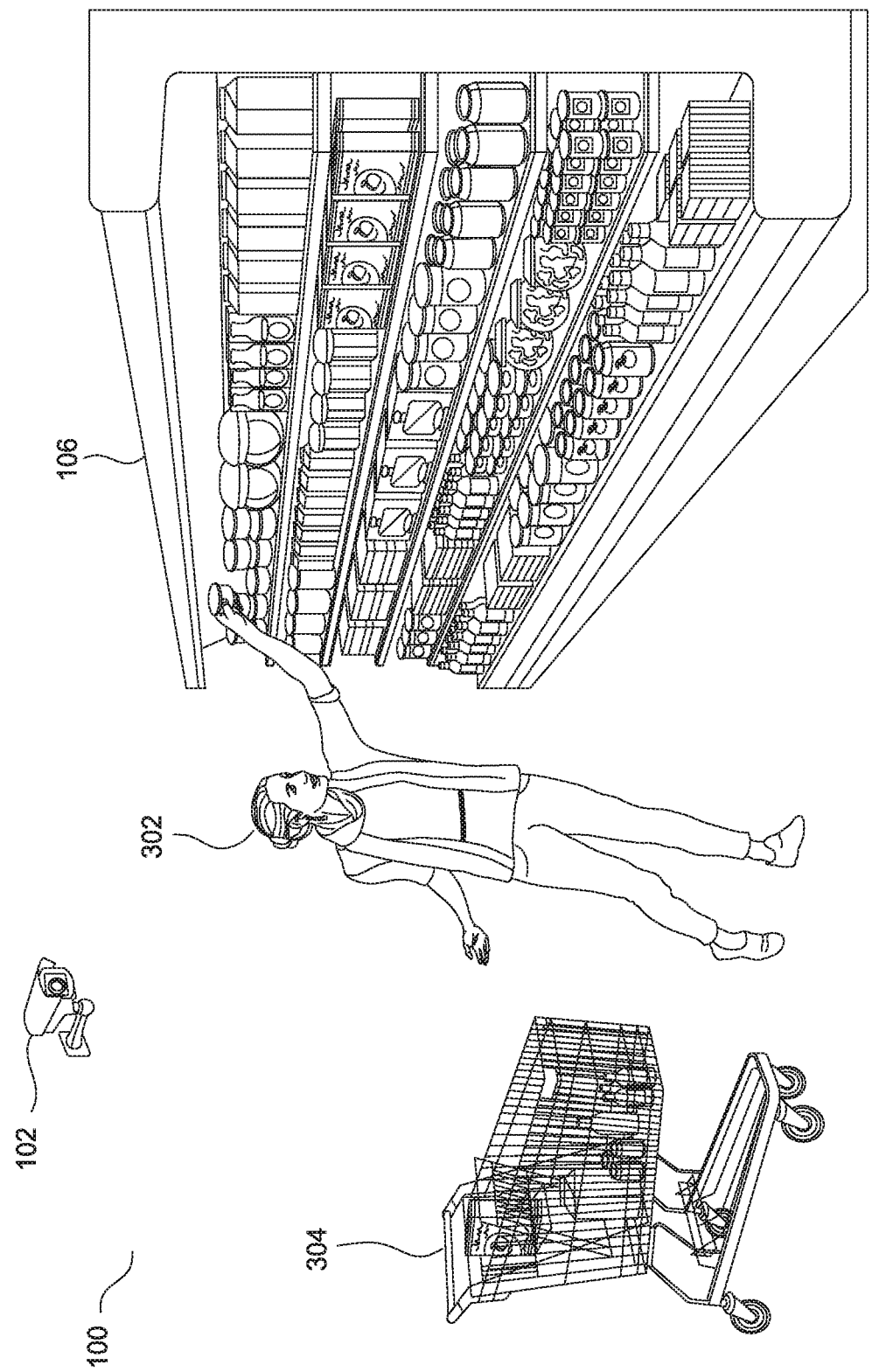

Turning to FIG. 5A, exemplary identification of a behavior of a customer with a purchasable item within the environment 100 is illustrated, according to one embodiment. After the customer 302 has entered the store and been identified, the customer 302 may begin shopping with a shopping cart 304. The visual sensors 102 within environment 100 are used to monitor the movement of customer 302 among the various display units 106. Once the customer 302 begins moving towards a specific display unit 106, the controller 201 may reorient or otherwise control the visual sensor 102 to better capture the customer's interaction with the display unit 106. For example, the controller 201 may recognize using the aforementioned image processing module 220 (FIG. 2) or the behavior classification module 222 (FIG. 2) that the customer 302 is stepping towards display unit 106.

Figure 5B:
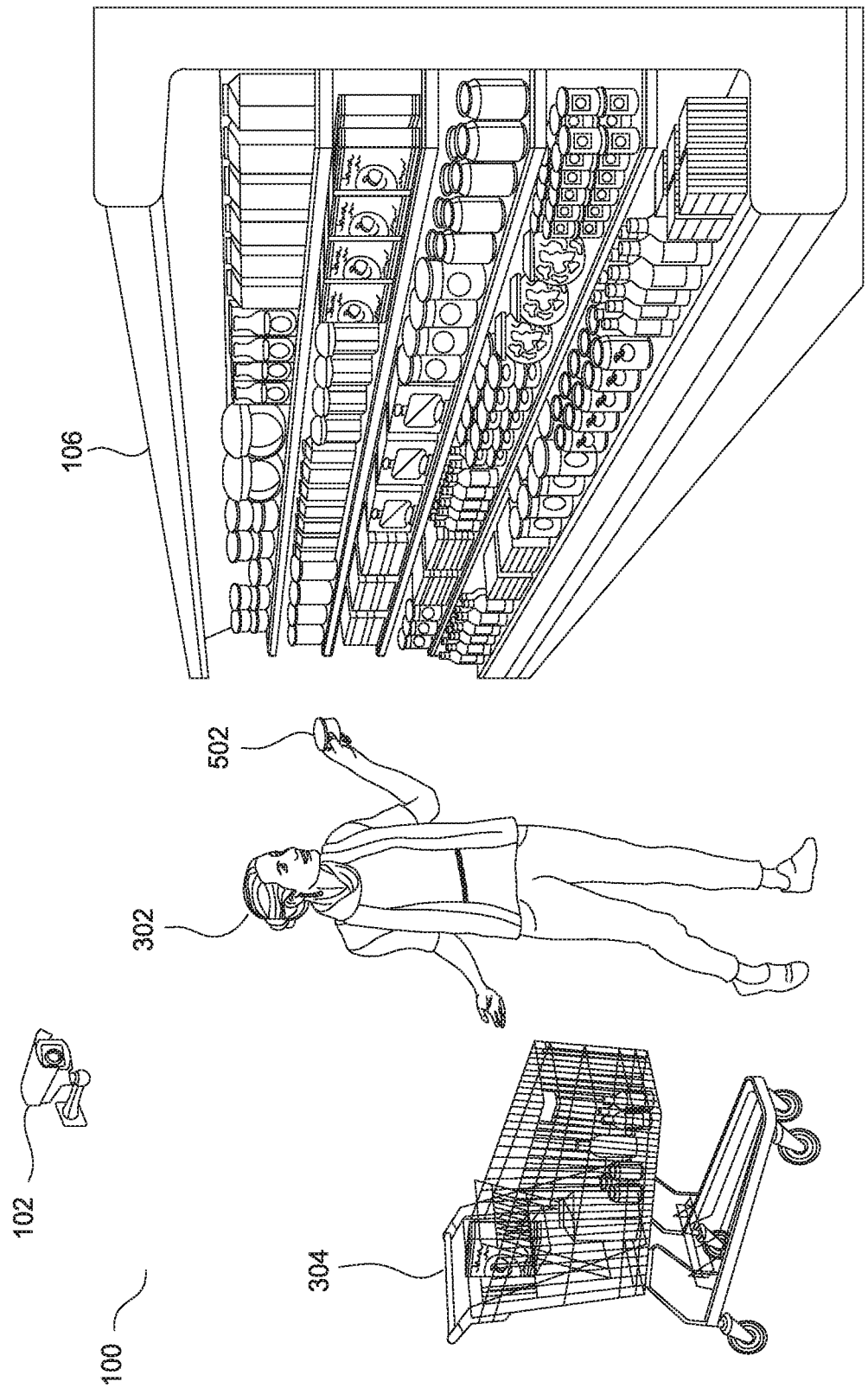

In FIG. 5B, the controller 201 may recognize customer 302 has interacted with a purchasable item 502. Specifically, the customer 302 has picked up item 502 from the display unit 106. At this point, the controller 201 may use the behavior classification module 222 (FIG. 2) to recognize the customer 302 has picked up purchasable item 502. The controller 201 then notifies transaction manager module 226 (FIG. 2) and store inventory manager module 228 (FIG. 2) that customer 302 has picked up an item. The transaction manager module 226 then updates the virtual transaction associated with customer 302 to reflect the picked up item. Similarly, store inventory manager module 228 updates the store inventory to reflect the customer picking up purchasable item 502.

For example, and referring back to FIG. 4A, say the purchasable item 502 is Item B. Store inventory 402 reflects customer 302 picking up Item B by decreasing the number available 410 of Item B by one (1). However, the number in stock 408 of Item B remains the same, as customer 302 has not yet completed a transaction (e.g., purchased Item B yet. Similarly, customer information 414 is updated to add Item B to virtual transaction 424. As can be seen, Item B is added under item I.D. 426, the quantity 428 is incremented by one, the location 430 of Item B is updated to the customer (or, more specifically, a shopping cart associated with the customer), and the item has not been purchased yet as reflected in the purchased status 434.

Returning to FIG. 5B, in an exemplary embodiment, the controller 201 operates in a binary manner regarding each purchasable item 502. Specifically, the controller 201 only determines whether the purchasable item 502 is associated with a person in the environment 100 or the purchasable item 502 is on a display unit 106. That is, after adding purchasable item 502 to the virtual transaction associated with customer 302, the transaction manager module 226 (FIG. 2) determines the purchasable item 502 remains associated with the customer 302 in the virtual transaction until the purchasable item is purchased or disassociated from the customer 302 (e.g., the purchasable item is returned to a display unit 106, taken by another customer, etc.). For example, customer 302 could place the purchasable item 502 in shopping cart 304. The customer 302 could then leave the shopping cart 304 to go to another display unit 106 on a different aisle. During this period, the transaction manager module 226 (FIG. 2) makes no determination or changes to the virtual transaction associated with customer 302. However, if another person comes upon the shopping cart 304 and removes purchasable item 502, the transaction manager module 226 will recognize this as an interaction with the purchasable item 502 and update the virtual transaction associated with customer 302 accordingly (i.e., decrement the item count).

In another exemplary embodiment, the transaction manager module 226 (FIG. 2) maintains the association of a purchasable item with a customer's virtual transaction even when the customer leaves the environment 100. For example, after placing the purchasable item 502 in shopping cart 304, the customer 302 may leave the environment 100 because customer 302 left their payment method in the car. The transaction manager module 226 will continue to associate the purchasable item 502 in the shopping cart 304 with the customer 302 until the customer 302 returns to the environment 100. If the customer 302 fails to return to the environment 100 within a predetermined amount of time, the transaction manager module 226 may remove the association of the purchasable item 502 and/or shopping cart 304 with customer 302. In this situation, the controller 201 may notify a store employee to restock the purchasable item 502 on the appropriate display unit 106. In another case, an employee begins restocking purchasable items 502 from the shopping cart 304 and the transaction manager module 226 disassociates the restocked items from the customer's 302 virtual transaction and adds the purchasable items 502 to the employee's virtual transaction until the purchasable items 502 are returned to a display unit 106, at which point the store inventory manager module 228 will associate them with the store inventory.

In another exemplary embodiment, the transaction manager module 226 maintains the customer's 302 association with a purchasable item 502, regardless of what shopping receptacle the purchasable item 502 is in. For example, a customer 302 may be using a shopping basket 306 upon entering the store. The customer 302 adds purchasable item 502 to the shopping basket 306. However, the customer 302 may realize the purchasable item 502 is too heavy to carry in just a shopping basket 306. Thus, the customer 302 may return the shopping basket 306 and add the purchasable item 502 to a shopping cart 304. During this interaction between the customer 302 and various shopping receptacles, the transaction manager module 226 does not update the association of the purchasable item 502 with the customer in the virtual transaction. That is, once the purchasable item 502 is associated with the customer 302, the transaction manager module 226 only disassociates the purchasable item 502 from customer 302 if purchasable item 502 is placed on display unit 106 or associated with another person within the environment 100. In this manner, the controller 201 may reduce the use of computing resources by not constantly monitoring the location of purchasable item 502.

Turning to FIG. 5C, an exemplary embodiment of a person returning a purchasable item to a display unit is shown, according to one embodiment. After picking up the purchasable item 502, say customer 302 realizes the purchasable item 502 is not a desired item. The controller 201 may recognize using image processing module 220 or behavior classification module 222 (FIG. 2) that the customer 302 is moving towards display unit 106 and is attempting to return purchasable item 502 to the display unit 106. The controller 201 then notifies transaction manager module 226 and store inventory manager module 228 (FIG. 2) that customer 302 has returned purchasable item 502 to the display unit 106. The transaction manager module 226 then updates the virtual transaction associated with customer 302 to reflect the returned item by decrementing the number of the item. Similarly, store inventory manager module 228 updates the store inventory to reflect the customer returning the purchasable item 502 to the display unit 106 by incrementing the number available of the item.

Figure 6B:
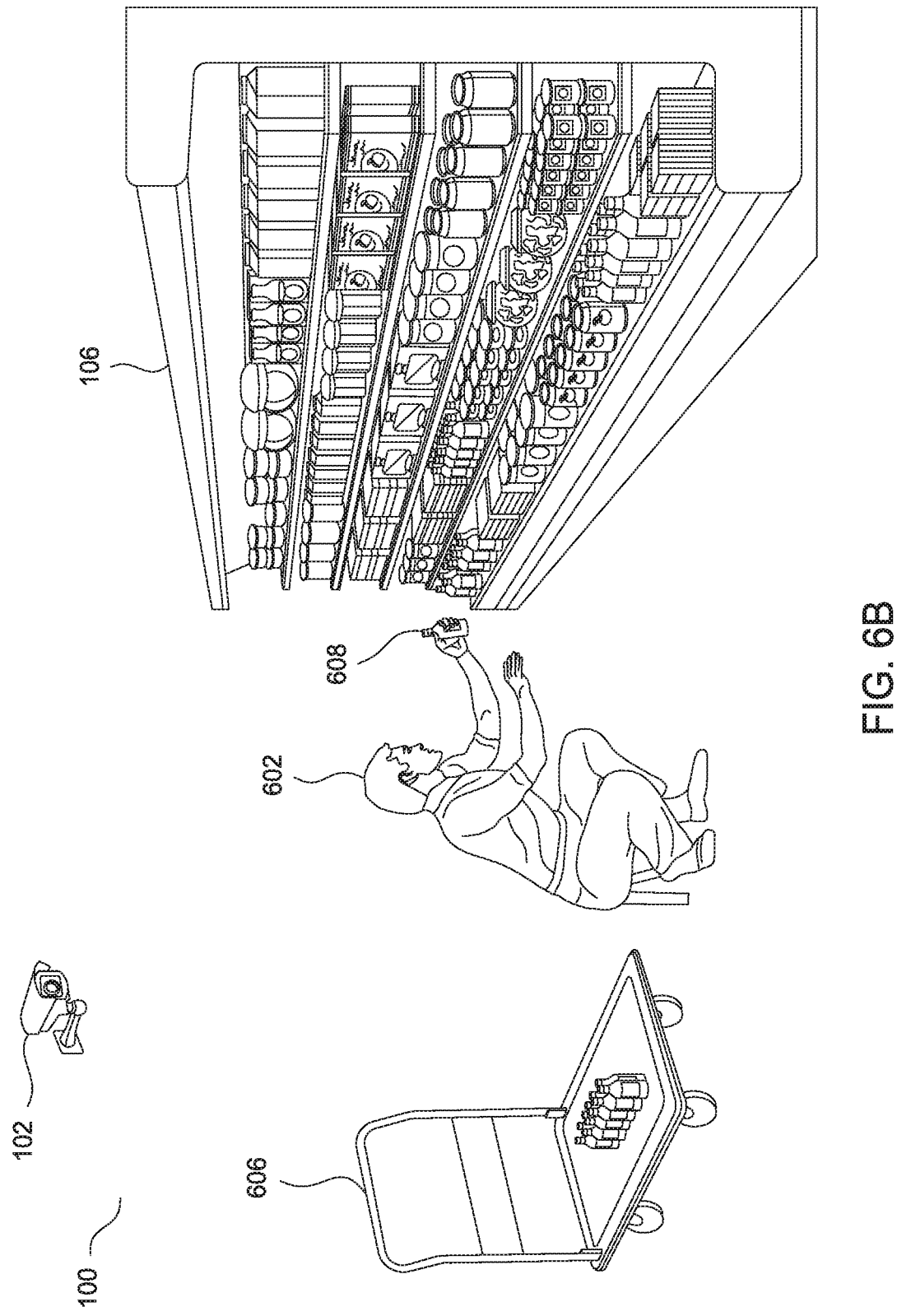

In FIGS. 6A and 6B, exemplary identification of a behavior of an employee with a purchasable item within the store is illustrated, according to one embodiment. In FIG. 6A, a shipment 114 of purchasable items 604 is unloaded by employee 602 at the back of environment 100. Image information acquired by the visual sensors 102 may be used to determine the employee 602 is unloading the purchasable items 604, and the controller 201 may control (e.g., reorient) the visual sensors 102 to better capture the interaction between the employee 602 and the purchasable items 604. The controller 201 may recognize using image processing module 220 or the behavior classification module 222 (FIG. 2) that the employee 602 is unloading the shipment 114 of purchasable items 604. As the employee 602 interacts with one of the purchasable items 604, the controller 201 notifies the transaction manager module 226 (FIG. 2) to update the virtual transaction of the employee 602. Additionally, the controller 201 may notify the store inventory manager 228 (FIG. 2) that a shipment of purchasable items 114 has arrived. The store inventory manager 228 may add each one of the purchasable items 604 to the store inventory 402 (FIG. 4A). In this manner, the controller 201 is able to keep track of the items being added to the inventory of the environment 100 in real time. The employee 602 may unload the purchasable items 604 onto a dolly 606. After the dolly 606 is fully loaded, the employee 602 may enter the store through door 115 to distribute the purchasable items 604 onto the various display units 106.

In FIG. 6B, the system may recognize the employee 602 is interacting with a purchasable item 608. Specifically, the employee 602 picks up purchasable item 608 and places purchasable item 608 on the display unit 106. At this point, the controller 201 may use the behavior classification module 222 to recognize the employee 602 has placed purchasable item 608 on display unit 106. The controller 201 then notifies transaction manager module 226 and store inventory manager module 228 that employee 602 has placed an item on the display unit 106. The transaction manager module 226 then updates the virtual transaction associated with employee 602 to reflect the placed item. Similarly, store inventory manager module 228 updates the store inventory to reflect the employee placing purchasable item 608 on the display unit 106.

For example, referring back to FIGS. 4A-4B, purchasable item 608 may be Item A. Store inventory 402 reflects employee 602 picking up Item A with number available 410 for Item A increasing by one (1). However, the number in stock 408 of Item A has been increased by two (2). The reason for this is the controller 201 or the employee 602 recognized one of Item A was damaged 452. For example, Item A may be broken, a safety seal on Item A has been breach, Item A has no longer meets the standards of the environment 100 (e.g., produce is brown or bruised, meat is discolored, etc.). Similarly, employee information 436 is updated to add Item A to virtual transaction 446. As can be seen, Item A is added under item I.D. 448, the quantity 450 is incremented by two (2), and the location 454 of Item A is the shelf.

Figure 7A:
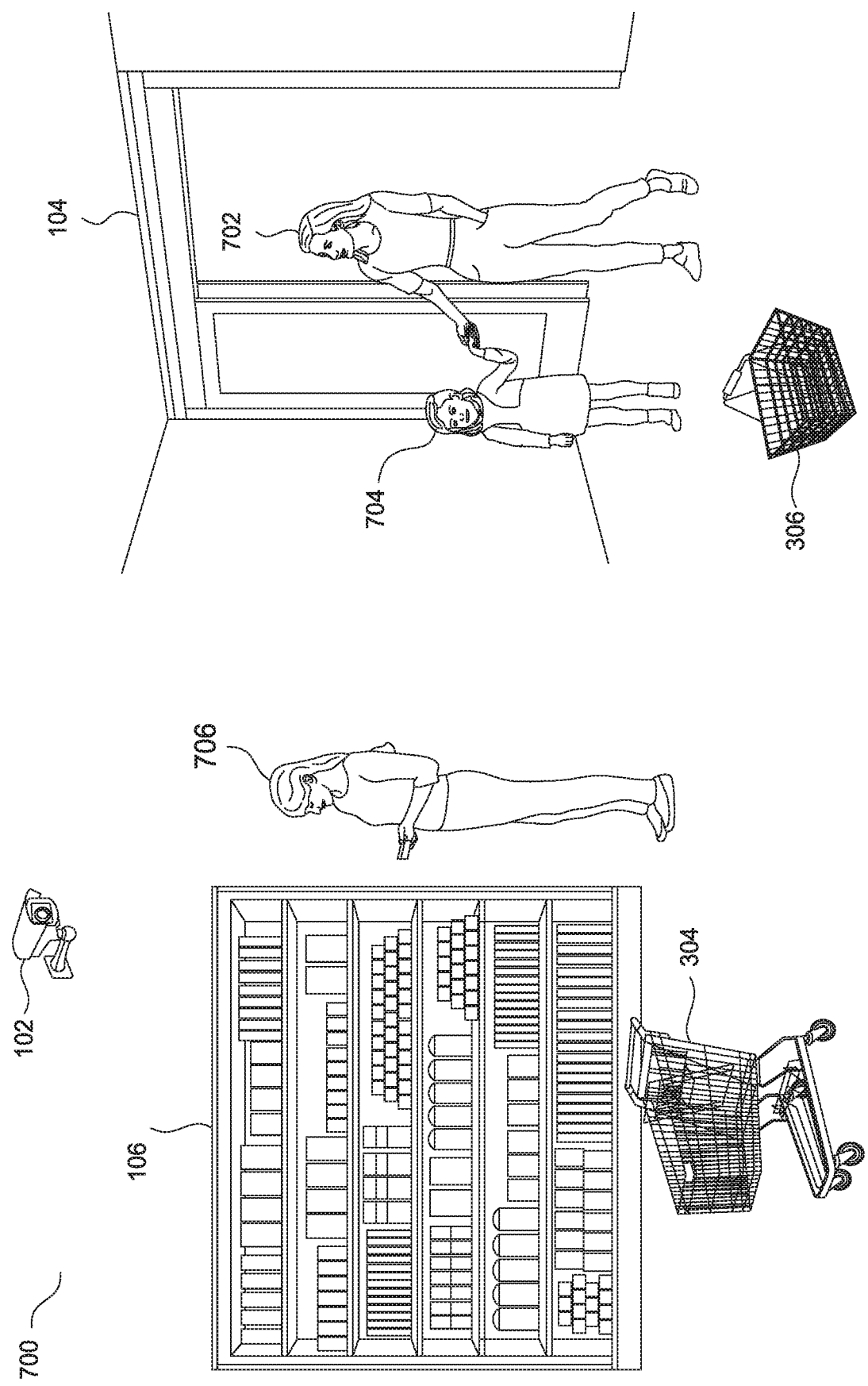

FIGS. 7A and 7B illustrate an exemplary association of multiple persons within an environment, according to one embodiment. Generally, view 700 illustrates operation of the association module 218 of the controller 201 of FIG. 2 within environment 100. In view 700, customers 702, 704, 706, enter through doorway 104 into environment 100. At least one of the visual sensors 102 is oriented to acquire image information including the customers 702, 704, 706. The customers may be identified using the acquired image information as explained in detail with regards to FIG. 3. The acquired image information may be used by image processing module 220 and/or association module 218 (FIG. 2), to determine whether the customers 702, 704, and/or 706 should be associated with a single virtual transaction, or whether each customer 702, 704, 706 should be associated with a respective virtual transaction. In one embodiment, the association module 218 is capable of identifying children within environment 100, and always pairs a child with an adult as children do not typically travel to an environment 100 on their own. As an example of pairing, if association module 218 determines customer 702 and 704 should be associated with a common virtual transaction or paired together, then any interaction with an item within environment 100 by either customer 702 or 704 will update the common virtual transaction. That is, if customer 702 picks up a purchasable item X and customer 704 picks up a purchasable item Y, the interactions with items X and Y are each added to a common virtual transaction.

In one embodiment, the association module 218 (FIG. 2) may calculate an association value using various observable parameters in view 700 when determining to associate more than one customer to a virtual transaction. Turning to FIG. 7B, with reference to FIG. 7A, an exemplary customer association 750 calculation is illustrated. As shown in FIG. 7B, customer association 750 identifies possible associations between the customers 702, 704, 706. While shown as determining associations for each possible pairing of the customers 702, 704, 706 (i.e., as First Customer I.D. 710 and Second Customer I.D. 712), in alternate embodiments the association module 218 may be configured to consider larger groupings of customers simultaneously (e.g., three or more). The association module 218 calculates values for one or more predetermined parameters relative to the identified First and Second Customer I.D.s 710, 712, such as Known Customer 714, Distance 716, Entrance Time 718, Physical Interaction 720, and Verbal Communication 722. From these calculated values, the association module 218 determines a Total Score 724 for each of the possible associations. As shown, a higher Total Score 724 correlates to an increased likelihood of association between the customers. In the example depicted in customer association 750, each of the predetermined parameters have a maximum possible score of one hundred (100). Assuming that the association module 218 sums the values of each of the predetermined parameters to produce the Total Score 724, the maximum Total Score 724 value is five hundred (500). The Total Score 724 may be determined using any other suitable arithmetic and/or logical functions, such as a weighted sum of the parameter values, comparing the parameter values with thresholds to produce a binary decision for each, fuzzy logic, and so forth. The association module 218 may compare the Total Score 724 value with a threshold value to determine an association exists between a particular pairing of customers such that the pairing of customers should be associated with a common virtual transaction. In other embodiments, the association module 218 may use any other suitable arithmetic and/or logical functions to determine whether a Total Score 724 value indicates a sufficiently strong interaction exists between a pairing of customers. Thus, the Total Score 724 value represents the association value determined with respect to a particular pairing of persons from a plurality of identified persons.

In one embodiment, Known Customer 714 is a parameter relating to if there is a known relationship between the First Customer I.D. 710 and Second Customer I.D. 712. Specifically, the Known Customer 714 parameter quantifies the likelihood there is a previously known relationship between two customers. Person identifying module 224 (FIG. 2) may identify customer 702 as a known customer within the environment 100. The known person data 236 (FIG. 2) for customer 702 may contain information, such as visually observable attributes described in detail with regards to FIG. 3, of persons known to associate with the customer (e.g., family members, coworkers). Customer 704 may match several of the visually observable attributes of a person known to associate with customer 702. Thus, the Known Customer 714 parameter would be scored higher. As an example, customer 704 may be the daughter of customer 702.

As shown in FIG. 7B, the association module 218 (FIG. 2) may recognize the previously established association between customer 702 and customer 704 (i.e., they are mother and daughter), and determines the Known Customer 714 parameter should be scored seventy five (75). As another example, the association module 218 may recognize that customer 706 has a few visually observable attributes of persons known to associate with customer 702 or customer 704, but determines that customer 706 is not a close match. Thus, the association module 218 scores the Known Customer 714 parameter eighteen (18) for the pairing of customers 702, 706, and sixteen (16) for the pairing of customers 704, 706 respectively.

In one embodiment, Distance 716 is a parameter taking into account the distance between the pairing of customers. Generally, when two customers are closer to each other, there is an increased likelihood that the two customers are associated and should be included in a common virtual transaction. To reflect this likelihood, the Distance 716 score may increase for a smaller determined distance between the customers. As shown in FIG. 7A, customer 702 and customer 704 are close to each other and thus have a relatively high Distance 716 score, when compared with a more distance customer 706. As shown, association module 218 scores the Distance 716 parameter relating customer 702 and customer 704 as a ninety-five (95).

The association module 218 may determine that the distance between customer 702 and customer 706, as well as the distance between customer 704 and customer 706, is sufficiently small that there is a substantial probability that at least one of customers 702, 704 are associated with customer 706. In one embodiment, the association module 218 compares the determined distance against a threshold distance value. For example, if the distance exceeds the threshold value (i.e., too far away) for a particular pairing of customers, the corresponding Distance 716 score is set to zero. However, if the distance is within the threshold value, the association module 218 calculates a relative Distance 716 score. As shown, the association module 218 determines that the distance between customer 704 and customer 706 is shorter than the distance between customer 702 and customer 706. Thus, the association module 218 scores the Distance 716 for customer 702 and customer 704 as an eighty-five (85), whereas the Distance 716 for customer 702 and customer 706 is a seventy-five (75). In this manner, the association module 218 is capable of recognizing that persons who are close together are more likely to be associated with one another.

In one embodiment, Entrance Time 718 is a parameter taking into account when a customer enters the environment 100 relative to another customer. Generally, the closer in time two customers enter environment 100, the more likely the customers are associated with one another. For example, if two customers enter at approximately the same time, the two customers are more likely to know each other, rather than being strangers. Thus, the Entrance Time 718 score is greater for reduced differences between entrance times of a pairing of two customers. Turning to FIG. 7A, customer 702 and customer 704 entered at approximately the same time. Thus, the Entrance Time 718 in FIG. 7B is scored relatively high at ninety-five (95). The association module 218 may recognize that customer 706 had entered shortly before customer 702 and customer 704, and further that customer 704 entered environment 100 before customer 702. Therefore, the Entrance Time 718 score for customer 702 and customer 706 is scored at seventy five (75) and the Entrance Time 718 score for customer 704 and customer 706 is scored at eighty five (85).

In one embodiment, Physical Interaction 720 is a parameter taking into account physical interactions between customers. Examples of physical interaction include physically touching, holding hands, having an arm draped over another person, and so forth. Generally, customers exhibiting physical interaction are more likely associated and should be included in a common virtual transaction. As shown in FIG. 7A, customer 702 is holding hands with customer 704. Thus, in FIG. 7B, the association module 218 (FIG. 2) determines the Physical Interaction 720 score is one hundred (100) for customer 702 and customer 704. Further, association module 218 may recognize customer 706 is too far away to have physical interaction with customer 702 or customer 704. Therefore, the association module 218 determines the Physical Interaction 720 score is zero (0) for the pairing of customer 702 and customer 706, as well as the pairing of customer 704 and customer 706.

In one embodiment, Verbal Communication 722 is a parameter taking into account verbal interactions between persons. Examples of verbal interactions include talking back and forth between two persons, talking in the general vicinity of another person, and so forth. The verbal interactions may be determined through acquired image information and/or through one or more audio sensors disposed within the environment. In one embodiment, the association module 218 correlates verbal communication with likelihood of association for a common virtual transaction. As shown in view 700, there is little verbal communication between customer 702, customer 704, and customer 706. Thus, the Verbal Communication 722 score is relatively low for each of the respective pairings of customers 702, 704, and 706.

As shown in FIG. 7B, Total Score 724 is the sum of the scores of Known Customer 714, Distance 716, Entrance Time 718, Physical Interaction 720, and Verbal Communication 722. In one embodiment, association module 218 determines a Total Score 724 greater than 300 indicates that a particular pairing of two customers should be associated together. Thus, the association module 218 may inform the transaction manager module 226 that the two customers should be on the same virtual transaction. For example, as shown in FIG. 7B, customer 702 and customer 704 have a Total Score 724 of 390. Because this Total Score 724 exceeds the threshold of 300, the association module 218 may inform transaction manager module 226 that customer 702 and customer 704 should be included on the same virtual transaction. Thus, item interactions performed by either of customers 702, 704 will be used to update a common virtual transaction. In some cases, determining that multiple customers 702, 704 should be included on a same virtual transaction comprises combining separate existing virtual transactions corresponding to each of the customers 702, 704. Further, as the Total Score 724 values for the pairing of customers 702, 706 (183) and the pairing of customers 704, 706 (206) are less than the threshold value of 300, the association module 218 communicates to transaction manager module 226 that customer 706 should have a separate virtual transaction.

In some embodiments, the association module 218 dynamically updates calculations of association values for various pairings of the identified customers 702, 704, 706, such that customers may be dynamically associated and/or disassociated. The updated calculations of association values may be based on some or all of the same parameters discussed above. Further, one or more additional parameters may be used to determine whether two or more associated customers should be disassociated.

In some embodiments, the association module 218 may calculate association values differently, depending on whether the customers are currently associated with a common virtual transaction or are associated with separate virtual transactions. The parameter values used to calculate association values may be weighted differently when the customers are associated with a common virtual transaction. In one non-limiting example, the physical interaction 720 and verbal communication 722 values may have a relatively smaller influence on the updated total score 724 than a distance 716 value, so that the associated customers tend to remain associated when their distance is sufficiently close, even though the customers are not detected as having continued physical interaction and/or verbal communication. In another non-limiting example, the distance 716 value has a relatively smaller influence on the updated total score 724. In this case, customers who are associated together with a common virtual transaction can browse and/or shop separately within the environment, and the customers' interactions operate to update the common virtual transaction.

In some embodiments, the association values may be based on a time-based decay function, such that the total score 724 value tends to decrease over time even if no changes occur to any of the associated parameter scores. Furthermore, in some embodiments, the threshold for associating two customers with a common virtual transaction differs from the threshold for disassociating two customers having a common virtual transaction.

While the above embodiments describe pairing customers upon entering environment 100, the customers may be paired at a different point in time and/or location. In one embodiment, the association module 218 (FIG. 2) determines whether to pair customers upon entering the checkout zone 108 (FIG. 1). As an example, customers 702, 704 may be identified upon entering environment 100 and the controller 201 (FIG. 2) may create respective virtual transactions for customers 702, 704 as previously described. Upon entering the checkout zone 108, the association module 218 may use the customer association 750 score, or similar techniques, to determine whether the customers 702, 704 should be associated with a single virtual transaction. If the association module 218 determines that customers 702, 704 should be paired together, the association module 218 may notify the transaction manager module 226 (FIG. 2) to combine the respective virtual transactions associated with customers 702, 704 into a single virtual transaction.

In one exemplary embodiment, the association module 218 (FIG. 2) pairs customers based on their observed interactions with a shared shopping receptacle (e.g., carrying or pushing the shopping receptacle, adding and/or removing purchasable items from the shopping receptacle, etc.). That is, if two or more customers are sharing a shopping receptacle, they are likely shopping together and should be associated on a single virtual transaction. As an example, customers 702, 704 may walk into environment 100 and may be identified upon entering environment 100 as previously described. Upon entering environment 100, customer 702 may interact with a shopping receptacle such as the shopping cart 304. The controller 201 may pair the shopping cart 304 with customer 702 based on customer 702's interaction with the shopping cart 304. Pairing the shopping cart 304 may include adding the shopping cart 304 to a virtual transaction associated with customer 702. After pairing the shopping cart 304 with customer 702, the association module 218 may pair a second customer with customer 702 upon the second customer interacting with the shopping cart 304. For example, customer 704 may remove an item from display unit 106 and add the item to shopping cart 304. The controller 201 recognizes that customer 704 added an item to shopping cart 304, which is already paired with customer 702, and adds customer 704 to the virtual transaction associated with customer 702. In this manner, the association module 218 determines customers 702, 704 should be associated with a single virtual transaction based on customers 702, 704 interacting with a single shopping cart 304.

In another exemplary embodiment, the association module 218 (FIG. 2) may continue to monitor customers 702, 704 after associating customers 702, 704 with a single virtual transaction to ensure the pairing is appropriate. As an example, customer 704 may have inadvertently placed an item into shopping cart 304, thinking the shopping cart 304 was customer 704's shopping cart. The association module 218 may monitor the interactions between customers 702, 704 using customer association 750, or similar techniques, as each customer interacts with the environment 100. If the customer association 750 score between customer 702 and 704 is too low (i.e., below an associated threshold value), the association module 218 may determine the pairing is improper and disassociate customer 704 from customer 702's virtual transaction.

Figure 8:
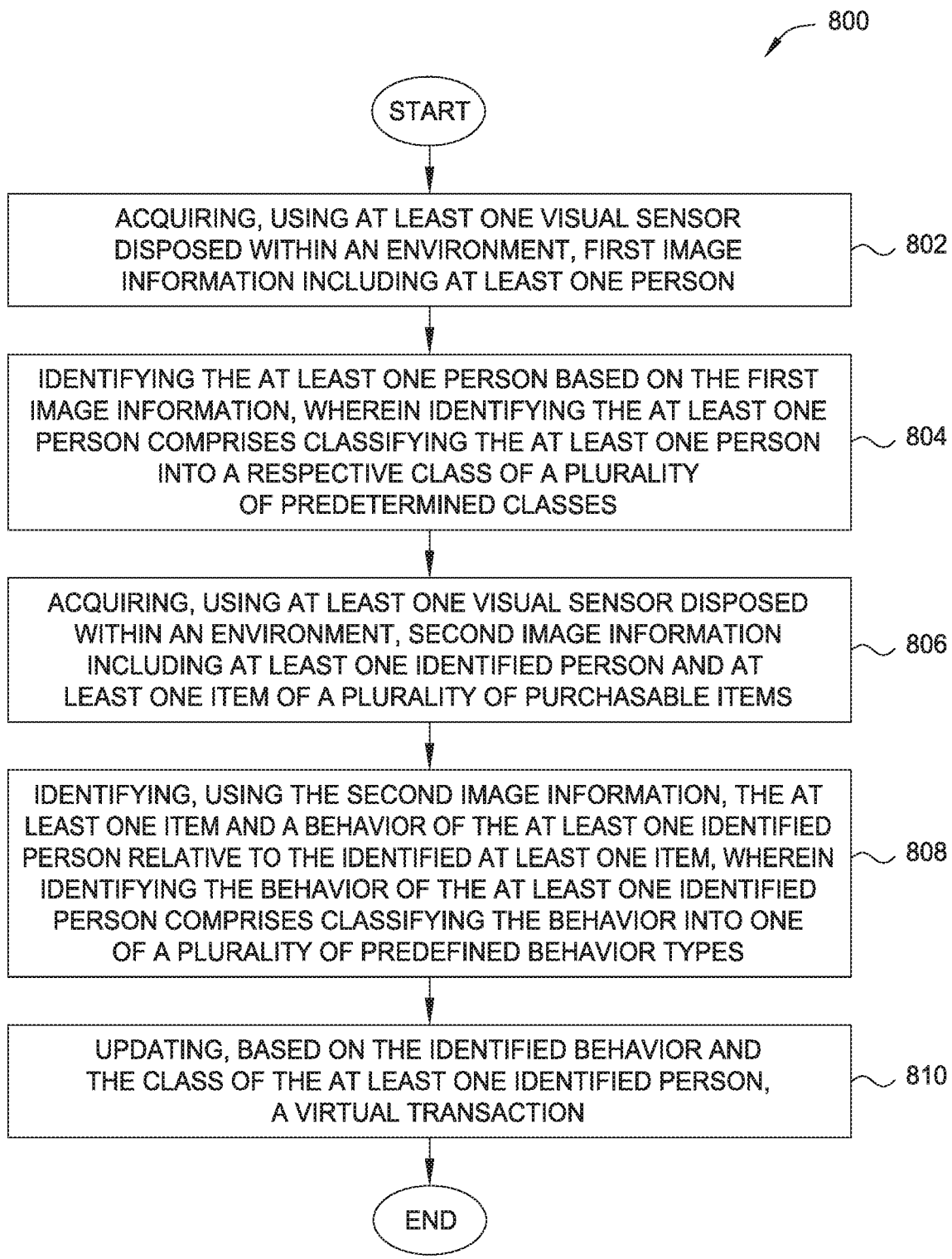
FIG. 8 illustrates a method of compiling a virtual transaction within an environment, according to one embodiment.

FIG. 8 illustrates a method of compiling a virtual transaction within an environment, according to one embodiment. The method 800 may be used in coordination with the systems and environments described herein.

Method 800 begins at block 802, where at least one image sensor acquires first image information including at least one person within the environment. In one embodiment, the first image information is acquired at the time the person enters the environment. In another embodiment, the first image information is acquired when the person interacts with an object within the environment.

At block 804, the at least one person is identified based on the first image information. The identification may include an analysis of the image information to determine physical attributes of the at least one person. In another embodiment, the system may compare the physical attributes of the at least one person to persons previously known to the environment.

Within block 804, identifying the at least one person comprises classifying the at least one person into a respective class of a plurality of predetermined classes. Some examples of predetermined classes include customer, employee, and vendor, but other classes are possible.

In some cases, the at least one person comprises a plurality of people identified based on the first image information. In some embodiments, an association module determines, based on a number of visually observable parameters, whether any of the plurality of identified people are sufficiently associated, such that at least two persons should be associated with a common virtual transaction. For example, the associate module determines an association value for each potential pairing of the plurality of identified people based on one or more predetermined parameters, such as Known Customer, Distance, Entrance Time, Physical Interaction, and Verbal Communication parameters.

At block 806, second image information is acquired using at least one visual sensor disposed within the environment. The second image information includes the at least one identified person and at least one item of a plurality of purchasable items. In one embodiment, the environment is a retail store and the plurality of purchasable items includes items typically found in a retail environment such as dry food, frozen food, fresh produce, clothing, hardware, tools, building supplies, and so forth.

At block 808, the second image information is used to identify the at least one item and a behavior of the at least one identified person relative to the at least one item. Identifying the behavior includes classifying the behavior into one of a plurality of predefined behavior types. Some examples of predefined behaviors include picking up an item from a display unit, holding an item, returning the item to a display unit, gesturing towards an item, and so forth.

At block 810, a virtual transaction associated with the at least one identified person is updated based on the identified behavior and the class of the at least one identified person. In one embodiment, updating the virtual transaction comprises adding the item to, or removing the item from, the virtual transaction. Further, the adding and/or removing the item may operate to remove and/or add the item from an inventory associated with the environment. In one embodiment, the determined class of the identified person is a customer and the virtual transaction comprises data on persons associated with the virtual transaction, payment types, whether an item has been purchased, and so forth. In one embodiment, the class of the person is employee and the virtual transaction comprises data on hours worked by the employee, whether the employee is on shift, whether the employee is on break, and so forth. Method 800 is completed following block 810.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, a user may access applications (e.g., a retail store app for a mobile computing device) or related data (e.g., compiled shopping data) available in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method of compiling a virtual transaction associated with at least two persons within an environment having a plurality of purchasable items, the method comprising:
   acquiring, using at least one visual sensor disposed within the environment, first image information including the at least two persons;
   identifying a first person of the at least two persons based on the first image information, wherein identifying the first person comprises classifying the first person into a respective class of a plurality of predetermined classes;
   identifying a second person of the at least two persons based on the first image information, wherein identifying the second person comprises classifying the second person into the respective class of the plurality of predetermined classes;
   determining based on the first image information that the identified at least two persons should be associated with a single virtual transaction, such that identified behaviors of each of the identified at least two persons are used to update the single virtual transaction;
   acquiring, using at least one visual sensor disposed within the environment, second image information including at least one of the two identified persons and at least one item of the plurality of purchasable items;
   identifying, using the second image information, the at least one item and a behavior of the at least one of the two identified persons relative to the identified at least one item, wherein identifying the behavior of the at least one of the two identified persons comprises classifying the behavior into one of a plurality of predefined behavior types;
   updating, based on the identified behavior and the class of the at least one of the two identified persons, the virtual transaction; and
   after determining that the first person is associated with the second person:
      continuing to monitor via the at least one visual sensor interactions between the first person and the second person to update a customer association score for pairing the first person and the second person; and
      in response to the customer association score being below a disassociation threshold value, disassociating the first person and the second person, wherein disassociating the first person and the second person comprises:
         placing representations of first items that the first person has been observed interacting with into a first individual data structure associated with the first person and not associated with the second person; and
         maintaining representations of second items that the second person has been observed interacting with in the single virtual transaction as a second individual data structure associated with the second person and not associated with the first person.

2. The computer implemented method of claim 1, wherein the plurality of predetermined classes comprises customers, employees, and vendors.

3. The computer implemented method of claim 1, wherein updating the virtual transaction comprises at least one of (1) adding the identified at least one item to a predetermined first data structure associated with the at least two identified persons and (2) removing the identified at least one item from the first data structure,
   wherein contents of the first data structure are based on the class associated with the at least two identified persons.

4. The computer implemented method of claim 3, further comprising:
   upon determining, based on third image information acquired using the at least one visual sensor, that the at least two identified persons entered a designated zone within the environment, completing the virtual transaction.

5. The computer implemented method of claim 3, wherein updating the virtual transaction further comprises:
   removing the identified at least one item from a second data structure associated with the environment upon adding the identified at least one item to the first data structure.

6. The method of claim 1, wherein determining that the identified at least two persons should be associated with a single virtual transaction further comprises:
   determining, via image processing of the first image information, whether the first person is associated with the second person based on factors including:
      a time of entry of the first person to the environment relative to the second person entering the environment; and
      a physical distance between the first person and the second person.

7. The method of claim 1, wherein the customer association score is updated based on a time-based decay function.

8. A system for compiling a virtual transaction associated with at least two persons within an environment having a plurality of purchasable items comprising:
   a plurality of visual sensors located throughout the environment;
   a controller configured to:
      acquire, using at least one visual sensor disposed within the environment, first image information including the at least two persons;
      identify a first person of the at least two persons based on the first image information, wherein identifying the first person comprises classifying the first person into a respective class of a plurality of predetermined classes;

identify a second person of the at least two persons based on the first image information, wherein identifying the second person comprises classifying the second person into the respective class of the plurality of predetermined classes;
    determine based on the first image information that the identified at least two persons should be associated with a single virtual transaction, such that identified behaviors of each of the identified at least two persons are used to update the single virtual transaction;
acquire, using the at least one visual sensor disposed within the environment, second image information including at least one of the two identified persons and at least one item of the plurality of purchasable items:
    identify, using the second image information, the at least one item and a behavior of the at least one of the two identified persons relative to the identified at least one item, wherein identifying the behavior of the at least one of the two identified persons comprises classifying the behavior into one of a plurality of predefined behavior types; update, based on the identified behavior and the class of the at least one identified person, the virtual transaction; and
after determining that the first person is associated with the second person:
    continuing to monitor via the at least one visual sensor interactions between the first person and the second person to update a customer association score for pairing the first person and the second person; and
in response to the customer association score being below a disassociation threshold value, disassociating the first person and the second person, wherein disassociating the first person and the second person comprises:
    placing representations of first items that the first person has been observed interacting with into a first individual data structure associated with the first person and not associated with the second person; and
    maintaining representations of second items that the second person has been observed interacting with in the single virtual transaction as a second individual data structure associated with the second person and not associated with the first person.

9. The system of claim 8, wherein the plurality of predetermined classes comprises customers, employees, and vendors.

10. The system of claim 8, wherein updating the virtual transaction comprises at least one of (1) adding the identified at least one item to a predetermined first data structure associated with the identified at least two persons and (2) removing the identified at least one item from the first data structure,
    wherein contents of the first data structure are based on the class associated with the identified at least two persons.

11. The system of claim 10, further comprising:
upon determining, based on third image information acquired using the at least one visual sensor, that the identified at least two persons entered a designated zone within the environment, completing the virtual transaction.

12. The system of claim 10, wherein updating the virtual transaction further comprises:

removing the identified at least one item from a second data structure associated with the environment upon adding the identified at least one item to the first data structure.

13. The system of claim 8, wherein determining that the identified at least two persons should be associated with a single virtual transaction further comprises:
determining, via image processing of the first image information, whether the first person is associated with the second person based on factors including:
    a time of entry of the first person to the environment relative to the second person entering the environment; and
    a physical distance between the first person and the second person.

14. The system of claim 8, wherein the customer association score falls below the disassociation threshold value in response to a time-based decay function lowering the customer association score from an initial value that exceeded an association threshold to an updated value below the disassociation threshold.

15. The system of claim 8, wherein the customer association score falls below the disassociation threshold value in response to receiving an updated parameter value that reduces the customer association score.

16. The system of claim 15, wherein the customer association score is based on a weighted summation of a plurality of parameters received from the at least one visual sensor.

17. A system for compiling, a virtual transaction associated with at least two persons within an environment having a plurality of purchasable items comprising:
a plurality of visual sensors located throughout the environment;
a controller configured to:
    acquire, using at least one visual sensor disposed within the environment, first image information including the at least two persons;
    identify a first person of the at least two persons based on the first image information, wherein identifying the first person comprises classifying the first person into a respective class of a plurality of predetermined classes;
    identify a second person of the at least two persons based on the first image information, wherein identifying the second person comprises classifying the second person into the respective class of the plurality of predetermined classes;
    determine based on the first image information that the identified at least two persons should be associated with a single virtual transaction, such that identified behaviors of each of the identified at least two persons are used to update the single virtual transaction;
    acquire, using the at least one visual sensor disposed within the environment, second image information including at least one of the two identified persons and at least one item of the plurality of purchasable items;
    identify, using the second image information, the at least one item and a behavior of the at least one of the two identified persons relative, to the identified at least one item, wherein identifying the behavior of the at least one of the two identified persons comprises classifying the behavior into one of a plurality of predefined behavior types;

update, based on the identified behavior and the class of the at least one identified person, the virtual transaction; and after determining that the first person is associated with the second person:

continuing to monitor via the at least one visual sensor interactions between the first person and the second person to update a customer association score for pairing the first person and the second person, wherein the customer association score is updated using a time-based decay function that lowers the customer association score over time; and in response to the customer association score being below a disassociation threshold value, disassociating the first person and the second person, wherein disassociating the first person and the second person comprises:

placing representations of first items that the first person has been observed interacting with into a first individual data structure associated with the first person and not associated with the second person; and maintaining representations of second items that the second person has been observed interacting with in the single virtual transaction as a second individual data structure associated with the second person and not associated with the first person.

* * * * *

UNITED STATES PATENT AND TRADEMARK OFFICE
CERTIFICATE OF CORRECTION

Page 1 of 1

PATENT NO.        : 11,074,632 B2
APPLICATION NO.   : 15/134185
DATED             : July 27, 2021
INVENTOR(S)       : John David Landers, Jr. et al.

It is certified that error appears in the above-identified patent and that said Letters Patent is hereby corrected as shown below:

On the Title Page

In item (56), in Column 2, under "Other Publications", Line 2, delete "&nsbp;&nsbp;" and insert --    --, therefor.

In the Specification

In Column 7, Line 1, after "member" delete "of the".

In the Claims

In Column 23, Line 15, in Claim 8, delete "items:" and insert -- items; --, therefor.

In Column 24, Line 30, in Claim 17, delete "compiling," and insert -- compiling --, therefor.

In Column 24, Line 63, in Claim 17, delete "relative," and insert -- relative --, therefor.

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*